United States Patent [19]

Wright

[11] 4,052,030

[45] Oct. 4, 1977

[54] SLIDE-IN MOUNTING BRACKET FOR CB RADIOS

[76] Inventor: Billy J. Wright, Rte. 2, Box 279A, Wichita Falls, Tex. 76301

[21] Appl. No.: 676,112

[22] Filed: Apr. 12, 1976

[51] Int. Cl.² ............................................. F16M 13/00
[52] U.S. Cl. ................................. 248/359; 248/225.2
[58] Field of Search ............... 248/73, 223, 224, 225, 248/316 D, 359, 360; 224/42.42 R, 42.45 R, 42.46 R

[56] References Cited

U.S. PATENT DOCUMENTS

| 567,157 | 9/1896 | Noyes | 248/224 |
|---|---|---|---|
| 839,654 | 12/1906 | Seachrest | 248/311.1 |
| 1,240,863 | 9/1917 | Lyda | 248/224 X |
| 1,883,834 | 10/1932 | Turner | 248/224 X |
| 1,889,742 | 12/1932 | Barclay | 248/316 D UX |
| 2,632,619 | 3/1953 | Wilson | 248/316 D UX |
| 2,665,166 | 1/1954 | Roark | 248/224 X |
| 3,298,655 | 1/1967 | Palm | 248/224 X |

Primary Examiner—William H. Schultz
Attorney, Agent, or Firm—Richards, Harris & Medlock

[57] ABSTRACT

A slide-in mounting bracket for CB radios includes a first plate having a mounting portion and an angularly upwardly extending portion. A plurality of fastener receiving holes are formed in the mounting portion of the first plate to facilitate installation of the bracket under the dash of a vehicle. A second plate overlies the angularly upwardly extending portion of the first plate for cooperation therewith to securely grip the standard mounting bracket of a CB radio therebetween. Alternatively, the mounting bracket may be mounted on a standard which in turn mounts on the floor of the vehicle.

7 Claims, 5 Drawing Figures

U.S. Patent  Oct. 4, 1977  4,052,030
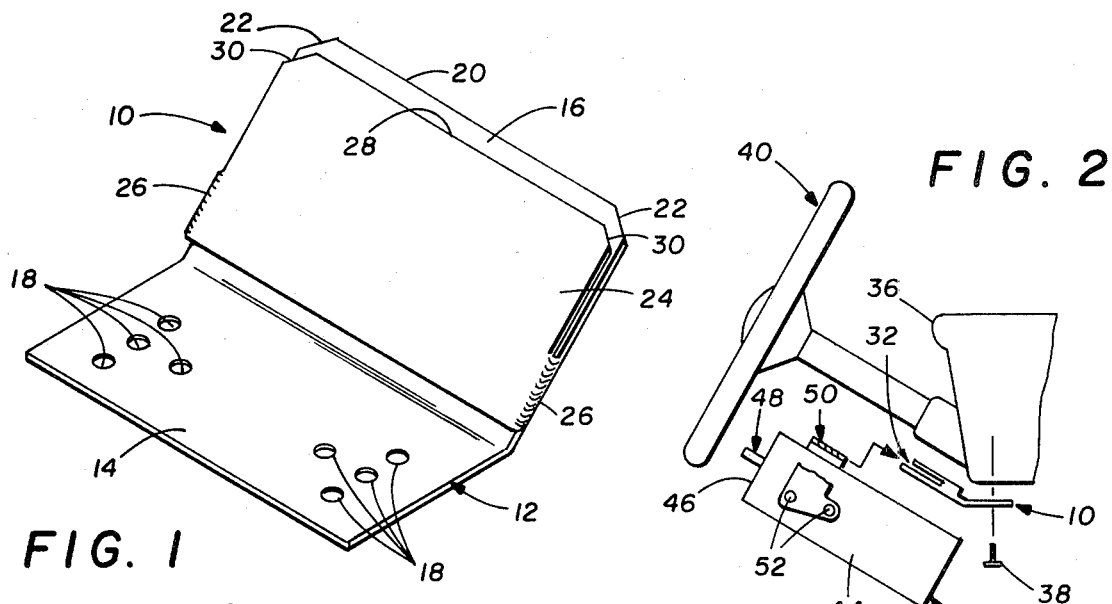
FIG. 2
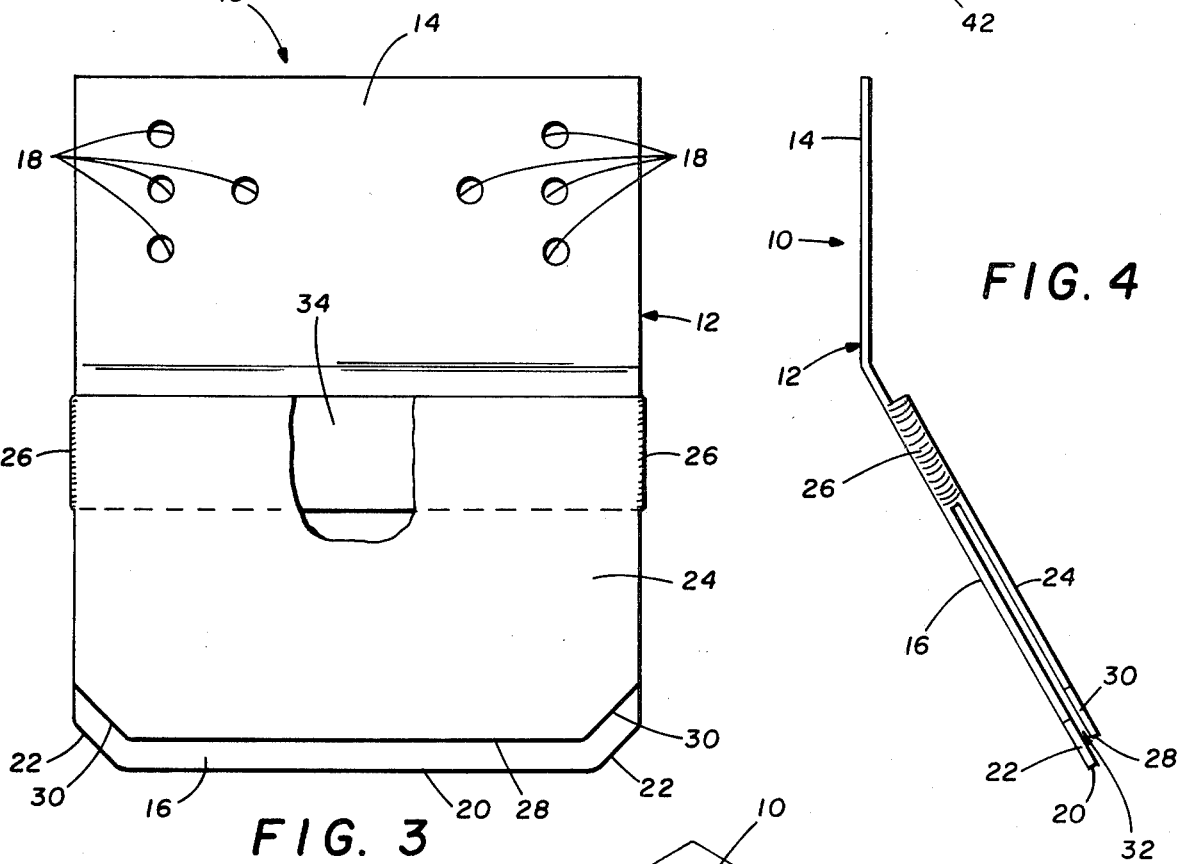
FIG. 1
FIG. 3
FIG. 4
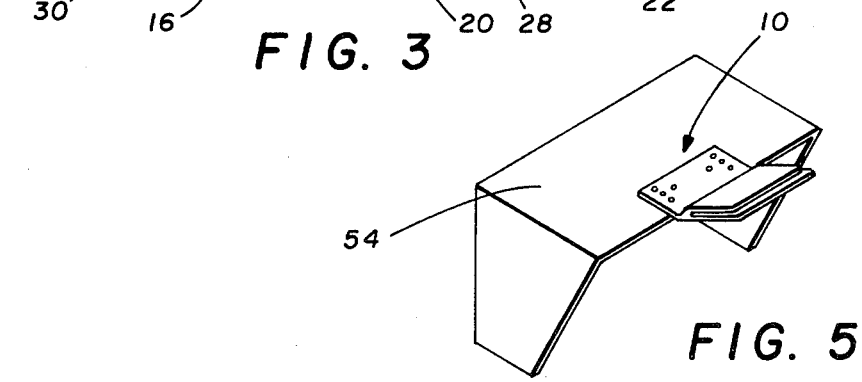
FIG. 5

SLIDE-IN MOUNTING BRACKET FOR CB RADIOS

BACKGROUND AND SUMMARY OF THE INVENTION

This invention relates to a slide-in mounting bracket for CB radios, and the like.

Citizen's band or CB radios have recently gained widespread popularity. One attendant problem involves the rampant theft to CB radios. Heretofore most attempts to overcome this problem have involved more or less sophisticated means of mounting CB radios in vehicles so as to prevent the unauthorized removal thereof. Such attempts at overcoming the problem have generally been unsuccessful, and CB radio theft continues to be a major crime problem.

The present invention involves a novel approach to the prevention of CB radio theft. Thus, rather than attempting to prevent unauthorized CB radio removal, the present invention comprises a mounting bracket which facilitates both the removal of a CB radio from a vehicle, and the subsequent reinstallation of the CB radio in the vehicle. In the practice of the invention the CB radio is removed from the mounting bracket and is placed in a secure location, such as the trunk of the vehicle or elsewhere, whenever the vehicle will be unattended. The CB radio is subsequently reinstalled in the mounting bracket whenever the use thereof is desired.

More specifically, the invention comprises a mounting bracket for CB radios including a first plate having a mounting portion and an angularly upwardly extending portion. A plurality of fastener receiving holes are formed through the mounting portion of the first plate to facilitate installation of the mounting bracket beneath the dash of a vehicle. Alternatively, the mounting bracket may be mounted on a standard which is in turn mounted on the floor of the vehicle.

A second plate overlies the angularly upwardly extending portion of the first plate and is secured thereto by suitable means, such as welding. The angularly upwardly extending portion of the first plate and the second plate are secured in a predetermined spaced apart relationship whereby the standard mounting bracket of a CB radio is securely retained therebetween. A CB radio is therefore readily installed on the mounting bracket by positioning the standard mounting bracket of the CB radio between the angularly upwardly extending portion of the first plate and the second plate comprising the mounting bracket. Removal of the CB radio is equally facilitated by disengaging the standard mounting bracket of the CB radio from between the plates comprising the mounting brackt.

An important feature of the invention involves the fact that the CB radio is supported in the mounting bracket with the face or front thereof in an angularly upwardly disposed orientation. This positions the dials, meters, switches and other operating instrumentalities of the CB radio in a more readily accessible orientation in addition to promoting the primary purpose of the invention which is to facilitate the removal of and the reinstallation of the CB radio in the mounting bracket.

DESCRIPTION OF THE DRAWINGS

A more complete understanding of the invention may be had by reference to the following Detailed Description when taken in conjunction with the accompanying Drawings, wherein:

FIG. 1 is a perspective view of a mounting bracket for CB radios incorporating the invention;

FIG. 2 is an illustration of the practice of the invention;

FIG. 3 is a front view of the bracket of FIG. 1;

FIG. 4 is an end view of the bracket; and

FIG. 5 is a perspective view illustrating a standard which may be mounted on the floor of the vehicle to support the mounting bracket of the present invention.

DETAILED DESCRIPTION

Referring now to the Drawings, and particularly to FIG. 1 thereof, there is shown a mounting bracket for CB radios 10 incorporating the present invention. The mounting bracket 10 includes a first plate 12 comprising a mounting portion 14 and an angularly upwardly extending portion 16. The mounting portion 14 has a plurality of fastener receiving holes 18 formed therethrough. The angularly upwardly extending portion 16 has a distal end 20 extending to a pair of beveled corners 22.

The mounting bracket 10 further includes a second plate 24 which overlies the angularly upwardly extending portion 16 of the first plate 12 and which is equal in width thereto. The second plate 24 extends parallel to and in a predetermined spaced apart relationship from the angularly upwardly extending portion 16 of the first plate 12. The second plate 24 is secured to the first plate 12 by means of a pair of weldments 26.

The second plate 24 extends to a distal end 28 having a pair of beveled corners 30. The distal end 28 of the second plate 24 is set back from the distal end 20 of the angularly upwardly extending portion 16 of the first plate 12. This is to facilitate the insertion of the standard mounting bracket of a CB radio between the second plate 24 and the angularly upwardly extending portion 16 of the first plate 12.

Referring to FIG. 4, the spaced apart positioning of the secod plate 24 relative to the portion 16 of the first plate 12 defines a gap 32 therebetween. The gap 32 is dimensioned to receive and retain the standard mounting bracket of a CB radio therein. Referring to FIG. 3, the spaced apart relationship between the second plate 24 and the portion 16 of the first plate 12 is maintained by a third plate 34 positioned between the first plate 12 and the second plate 24. The third plate 34 is equal in width to the first and second plates, and is secured thereto by means of the weldments 26.

As an alternative construction to that shown in the drawings, the third plate may comprise an offset portion of the second plate. In either construction the plates may be formed together by rivets or other fasteners, rather than by means of welding.

The mounting bracket 10 as illustrated in FIGS. 1, 3 and 4 is preferably formed from one of the various metals that are commonly utilized in the manufacture of automotive type mounting brackets. For example, the mounting bracket 10 may be formed from cold rolled steel, or the like. The mounting bracket 10 may also be formed from various plastic materials. For example, the mounting bracket 10 may be formed from fiberglass, nylon, ABS, or the like.

FIG. 2 illustrates the use of the mounting bracket 10 of the present invention. The mounting bracket 10 is installed beneath the dash 36 of a vehicle, such as an automobile, a truck, a boat, an aircraft, or the like. Suitable fasteners 38 are utilized to secure the mounting bracket 10 beneath the dash 36. The fasteners 38 are directed through the fastener receiving holes 18 of the mounting portion 14 of the first plate 12 of the mounting bracket 10, and are received in fastener receivig holes formed in the underside of the dash 36. The fasteners 38 are then engaged with suitable fastening means to secure the mounting bracket 10 in place. The mounting bracket 10 may be positioned on either side of the steering wheel 40 of the vehicle.

Once installed, the mounting bracket 10 is utilized to support a CB radio 42 beneath the dash 36 of the vehicle. The CB radio 42 includes a chassis 44 which may be rectangular in shape. The chassis 44 has a front or face 46 comprising a plurality of knobs 48 as well as various switches, dials, meters, jacks, and the like. A standard mounting bracket 50 is secured to the chassis 44 of the CB radio 42 by means of a plurality of fasteners 52. The mounting bracket 50 extends across the top of the chassis 44 and is spaced apart a predetermined distance therefrom. More importantly, the mounting bracket 50 has a predetermined thickness which is standard in virtually all CB radio designs.

It will be understood that the mounting bracket 50 is conventionally utilized to secure the CB radio beneath the dash 36 of the vehicle. This is accomplished by removing the fasteners 52 to disengage the mounting bracket 50 from the chassis 44 of the CB radio 42, and then utilizing the fasteners 38 to secure the mounting bracket beneath the dash 36. Thereafter the fasteners 52 are reengaged wih the mounting bracket 50 and the chassis 44 to secure the CB radio 42 to the mounting bracket 50 thereof, and hence to secure the CB radio 42 beneath the dash 36.

In accordance wiht the present invention, the mounting bracket 50 of the CB radio 42 is not secured beneath the dash 36 of the vehicle by means of fasteners. Instead, the mounting bracket 50 is received in the gap 32 extending between the angularly upwardly extending portion 16 of the first plate 12 and the second plate 24 of the mounting bracket 10. The positioning of the second plate 24 relative to the upwardly extending portion 16 of the first plate 12 is such that the mounting bracket 50 and hence the entire CB radio 42 is securely retained in the mounting bracket 10. However, the mounting bracket 50 is readily disengaged from the mounting bracket 10, whereby the CB radio 42 may be readily removed from the vehicle and thereafter positioned in a secure location, such as the trunk or other storage compartment of the vehicle, or in a secure location completely removed from the vehicle.

The removal of the CB radio 42 from the vehicle and the subsequent reinstallation of the CB radio 42 in the vehicle may be further facilitated by providing the CB radio 42 with electrical connections which are readily disengagable and subsequently readily reengagable. Various quick-disconnect couplings may be utilized for this purpose. Altneratively, the electrical lead to the CB radio 42 may be fitted with a connector which is engagable with the cigarette lighter of the vehicle. In this regard, it will be understood that the antenna lead to the CB radio 42 is typically provided with a jack type connector, whereby the antenna lead is typically readily disengagable from and readily reengagable with the CB radio 42.

FIG. 2 further illustrates an advantageous feature of the present invention. Thus, whereas CB radios are typically installed in vehicles with the front of face 46 thereof in a vertical orientation, the use of the mounting bracket 10 of the present invention facilitates the positioning of a CB radio in a vehicle with the front or face 46 thereof in an angularly upwardly disposed orientation. This is highly advantageous in facilitating access to the knobs, switches, dials, jacks, meters and the like comprising the front or face of the CB radio. Likewise, the angularly upwardly disposed orientation of the CB radio promotes the primary purpose of the invention, which is to facilitate both the removal of the CB radio from and the subsequent reinstallation of the CB radio in the vehicle comprising the dash 36.

Those skilled in the art will appreciate the fact that in certain instances there is insufficient room beneath the dash of a vehicle to permit the use of the present invention. Referring to FIG. 5, there is shown a standard 54 which may be mounted on the floor of a vehicle. The standard 54 in turn supports the mounting bracket 10 of the present invention. The mounting bracket 10 is thereafter utilized to receive and support a CB radio in the same manner as that illustrated in FIG. 2.

From the foregoing, it will be understood that the present invention incorporates numerous advantages over the prior art. Thus, the use of the present invention facilitates the removal of a CB radio from and the subsequent reinstallation of a CB radio in a vehicle. In this manner the use of the invention operates to prevent CB radio theft by eliminating the necessity of leaving a CB radio in an unattended vehicle. Another advantage deriving from the use of the invention involves the fact that by means thereof a CB radio is oriented with the face or front of the chassis in an angularly upwardly disposed orientation. This not only facilitates the use of the CB radio but also facilitates the removal of the CB radio from and the reinstallation of the CB radio in the vehicle.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. For use in conjunction with CB radios of the type having a chassis and a mounting bracket of predetermined thickness extending over the top of the chassis and spaced apart therefrom, a slide-in mounting bracket comprising:

a first place including a mounting portion and an angularly upwardly extending portion;

the mounting portion of the first plate having a plurality of fastener receiving apertures formed therethrough whereby the mounting bracket may be secured on a vehicle;

a second plate equal in width to the first plate and extending parallel to and spaced a predetermined distance apart from the angularly upwardly extending portion of the first plate for receiving and retaining a CB radio mounting bracket therebetween and thereby securely retaining the CB radio while facilitating removal thereof; and a standard comprising a top member and a pair of depending leg members spaced apart to receive the CB radio therebetween, the mounting portion of the first plate of the mounting bracket being secured to the top member of the standard.

2. The mounting bracket according to claim 1 further including means positioned adjacent the point of intersection of the mounting portion and the angularly upwardly extending portion of the first plate for maintaining the predetermined spaced apart relationship between the first and second plates.

3. The mounting bracket according to claim 2 wherein the first and second plates are secured together by weldments extending along the opposite edges thereof.

4. The mounting bracket according to claim 2 wherein the angularly upwardly extending portion of the first plate extends beyond the end of the second plate to facilitate the receipt of the mounting bracket of the CB radio therebetween.

5. For use in conjunction with CB radios of the type having a chassis and a mounting bracket of predetermined thickness extending over the top of the chassis and spaced apart therefrom, a slide-in mounting bracket comprising:

a first plate including a mounting portion and a substantially flat, planar jaw portion formed integrally with the mounting portion and extending angularly upwardly with respect thereto;

the mounting portion of the first plate having a plurality of fastener receiving holes extending therethrough;

a substantially flat, planar second plate equal in width to the first plate and overlying the angularly upwardly extending portion of the first plate;

means for maintaining the flat, planar second plate in a parallel and predetermined spaced apart relationship to the flat, planar angularly upwardly extending jaw portion of the first plate whereby the mounting bracket of a CB radio is securely retained between the angularly upwardly extending jaw portion of the first plate and the second plate; and the angularly upwardly extending jaw portion of the first plate extending longitudinally beyond the end of the second plate for facilitating the receipt of the mounting bracket of a CB radio therebetween.

6. The mounting bracket according to claim 5 wherein the first and second plates are secured together by weldments extending along the opposite edge thereof.

7. The mounting bracket to claim 5 wherein the means for maintaining the second plate in a parallel and spaced apart relationship to the angularly upwardly extending portion of the first plate comprises a third plate positioned between the second plate and the angularly upwardly extending portion of the first plate.

* * * * *